UNITED STATES PATENT OFFICE.

KARL ELBEL, OF BIEBRICH, GERMANY, ASSIGNOR TO THE FIRM OF KALLE & COMPANY, AKTIENGESELLSCHAFT, OF BIEBRICH, GERMANY.

NITRO-ORTHO-OXY-AZO COLORS AND PROCESS OF MAKING SAME.

958,912.  Specification of Letters Patent.  Patented May 24, 1910.

No Drawing.  Application filed January 4, 1910. Serial No. 536,429.

*To all whom it may concern:*

Be it known that I, KARL ELBEL, doctor of philosophy and chemist, subject of the King of Prussia, residing at Biebrich-on-the-Rhine, Germany, have invented certain new and useful Improvements in the Manufacture and Production of Pure Nitro-Ortho-Oxy-Azo Coloring-Matters, of which the following is a specification.

If 1-diazo-2-oxy- and 2-diazo-1-oxy-naphthalene-sulfonic acids are treated with nitrating agents the corresponding nitro-diazo-oxy compounds are formed. But these bodies are not pure. They contain various by products, which are easily recognizable if the so obtained nitro-diazo-oxy compounds are combined for instance with alpha- or beta- naphthol forming coloring matters. The combination mass contains always besides the proper dye a certain quantity of brown or yellowish impurities which can only be removed very difficultly impairing largely the yield of coloring matter.

I have now found that pure nitro-azo-oxy coloring matters may be obtained if the crude nitro-diazo-oxy compound is dissolved in water and alkali and reprecipitated as a zinc compound by addition of a zinc salt and, if necessary, of common salt, and if this zinc compound, after filtering and pressing, is combined with a suitable body for instance alpha- or beta- naphthol. The so obtained dyes, which separate on neutralizing or acidulating the reaction mass, as water soluble zinc-alkali compounds in a very pure state, yield when dyed on wool in an acid bath and subsequently treated with a bichromate, shades which are much brighter than those of nitro-oxy-napthalene-azo-colors obtainable in the manner hitherto known. They do not stain white cotton contained in the woolen fabric and show a great resistance to the potting process. These advantages are consequences of the employment of zinc salts in separating the nitro-diazo-oxy compound as well as of the application of the nitro-diazo-oxy zinc compounds for the manufacture of the dyestuffs.

In order to illustrate the new process I give the following example:

(*a.*) 270 parts of the dry zinc salt of the diazo compound of 1-amido-2-naphthol-4-sulfonic acid are finely sifted and stirred, at from 5°, to 8°, centigrade, into 810 parts of sulfuric acid of 66° Baumé. After the introduction is completed, the mass is cooled to about 3° centigrade and, at a temperature from 3°, to 5°, centigrade, 164 parts of mixed acid of 38.4 per cent. nitric acid are allowed to run, drop by drop, onto it. After four hours stirring, the nitrating mixture is poured onto 900 parts of ice, and the acid is separated, filtered by suction, and pressed out. The compressed cake is stirred in 1000 parts of water at from 13°, to 20°, centigrade, and neutralized with sodium carbonate (120 parts), the solution being filtered, and the filtrate mixed, at 35° centigrade with a filtered solution of 150 parts of zinc-sulfate and 500 parts of water. For the purpose of precipitating the zinc salt, 300 parts of common salt are stirred into the solution and the zinc salt is filtered off by suction, pressed and dried, at from 40°, to 50°, centigrade.

(*b.*) In a mixture of 100 parts of caustic soda lye of 40° Baumé and 100 parts of water are stirred 30 parts of alpha-naphthol. After the alpha-naphthol has dissolved, the solution is cooled down to 10°, centigrade and 70.5 parts of the diazo-zinc salt are introduced in successive portions. After the introduction of this salt is completed, the mass is stirred for another three quarters of an hour and the dyestuff is poured into 1000 parts of cold water. On adding about 80 parts of hydrochloric acid, the coloring matter is precipitated as a zinc compound. It is filtered off by suction, pressed and dried.

In the foregoing example the diazo-naphthol-sulfonic acid can be replaced by other analogous compounds and the alpha-naphthol can be replaced by other chromogens.

Now what I claim is:

1. As a new process the manufacture of pure nitro-ortho-oxy-azo coloring matters by precipitating from the reaction mass obtained by the nitration of 1-diazo-2-oxy-naphthalene-sulfonic acids, by means of soluble zinc salts, pure nitro-1-diazo-2-oxy-naphthalene-sulfonic acid in the form of a zinc salt, and combining such salt with a chromogen to form a soluble zinc salt, of the corresponding coloring matters.

2. As a new product the coloring matter obtained by dissolving the crude nitro-1-diazo-2-oxy-naphthalene-sulfonic acid in water and alkali, precipitating a zinc compound by means of zinc-sulfate and common salt, combining this zinc compound with alpha-naphthol and precipitating the dyestuff as zinc-alkali compound by means of an acid being a black powder soluble in water with violet-red color, changing on addition of alkali into a more bluish-violet, on addition of hydrochloric acid into brown-red, soluble in sulfuric acid with bright greenish-blue color, yielding when dyed on wool in an acid bath and subsequently treated with a bichromate, bluish grey to black shades fast to potting, and which does not stain white cotton in an acid dye bath.

In testimony whereof I have signed my name to this specification in the presence of two subscribing witnesses.

KARL ELBEL.

Witnesses:
  JEAN GRUND,
  CARL GRUND.